United States Patent [19]
Horres

[11] 3,781,050
[45] Dec. 25, 1973

[54] EYE CONTACT LENS MANIPULATOR

[76] Inventor: Eugene S. Horres, 1736 Savanah Hwy., Charleston, S.C.

[22] Filed: Dec. 15, 1971

[21] Appl. No.: 208,156

Related U.S. Application Data

[63] Continuation-in-part of Ser. No. 40,879, May 27, 1970, Pat. No. 3,645,576.

[52] U.S. Cl. ............................ 294/1 CA, 294/64 R
[51] Int. Cl. ............................................. A61f 9/00
[58] Field of Search .......................... 294/1 CA, 64; 73/432; 128/303

[56] References Cited
UNITED STATES PATENTS

| | | | |
|---|---|---|---|
| 2,924,481 | 2/1960 | Wagstaff | 294/1 CA X |
| 2,919,696 | 1/1960 | Rinaldy | 294/1 CA X |

*Primary Examiner*—Evon C. Blunk
*Assistant Examiner*—Johnny D. Cherry
*Attorney*—Herbert M. Birch et al.

[57] ABSTRACT

A device for inserting and removing a contact lens with respect to the eye. The device includes a tubular handle for mounting an oval loop to engage the eye lid to prevent eye blinking and a turnable control shaft with a flexible end portion extending from the handle for mounting a lens inserter and remover, and a finger activated spring filament to move the flexible end portion to and from the eye. The control shaft at the opposite end from the eye lid loop has keyed or secured to it a knurled knob with a reduced portion rotatable in the open end of the handle for turning the shaft and positioning the lens inserter and remover as desired. Also, the reduced portion of the knob includes a spring pressed ball to retain the shaft to its turned positions for lens insertion or lens removal.

2 Claims, 3 Drawing Figures

PATENTED DEC 25 1973  3,781,050

INVENTOR.
EUGENE S. HORRES
BY
*Birch & Birch*

EYE CONTACT LENS MANIPULATOR

The present invention relates to a device for inserting a contact lens in and for removing it from the human eye and is a continuation-in-part of my prior copending application Ser. No. 40,879, filed May 27, 1970, now U.S. Pat. No. 3,645,576, for, An Eye Contact Lens Manipulator.

An object of this invention is to provide a contact lens holder controlled for insertion and removing contact lens more efficiently to and from the surface of a person's eyeball.

In my prior co-pending invention there was no adjustable means provided for selective manipulation of the lens holder to respective lens inserter and remover positions, whereby either insertion or removal of the lens may be accomplished.

Also, in combination with means for selective manipulation of the lens holder to lens inserter and lens remover positions the present device includes a non-blink ring for eye lid engagement to prevent blinking of the eye during lens insertion or removal.

Yet another object of the present invention is to provide a turnable control shaft in a tubular handle with a bore formed to receive and mount the turnable shaft which is formed with a flexible spring section for mounting the lens changer or holder at its distal end, and with a knurled knob at the opposite end of the turnable shaft having a reduced portion secured to the turnable shaft in the end of the handle, whereby the knob is exposed for turning to position the lens changer or holder to selected positions.

Still another object is to provide in combination with a lens insertion and remover means mounted at the flexible resilient free end of a rotable shaft, a novel resilient spring filament juxtaposed for finger activation into engagement with the said flexible resilient end of the rotatable shaft, whereby a lens carried by the lens insertion and remover means may be processed with respect to the eye.

These and still further objects, advantages and features of the invention will be apparent from the following description considered together with the accompanying drawing.

Figure 1:
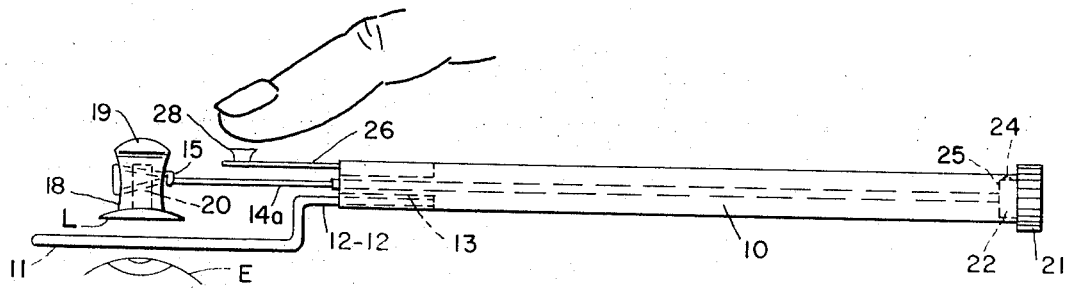
FIG. 1 is a side view of an embodiment of my invention assembled and in position with respect to the eyeball of a person showing the lens in the inserter portion of the combined lens inserter and remover positioned to insert a lens including the finger activated spring filament for the lens changer.
Figure 2:
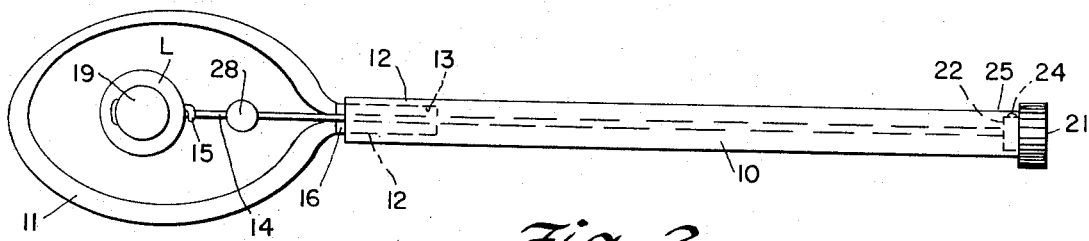
FIG. 2 is a top view of the embodiment of FIG. 1.

Referring with more particularity to the drawing in which like numerals designate like parts, the embodiment herein illustrated in FIGS. 1 and 2 comprises a tubular handle 10 open at each opposite end formed of any suitable material, such as plastic, metal or the like similar to my above-identified prior co-pending application. This handle is formed at one end with a socket 13 and receives the parallel fingers 12, 12 of the oval loop 11 for contact with the eye lid to prevent eye blinking when the lens are being inserted or removed as shown in my application Ser. No. 40,879.

Now with further reference to FIG. 2, the handle 10 serves to mount an elongated turnable control shaft 14 formed at one end with a flexible section, such as a resilient filament of spring metal or other suitable material 14a. The extended end of flexible section 14a is formed with a suitable loop 15 to mount a lens inserter and lens remover 16 comprised of a reduced midsection or mid-riff 18 and lens remover and inserter portions 19 and 20, respectively. Such loop may be formed as in FIG. 1, which is in like manner to the portion 17 of my prior co-pending application and may engage around the mid-riff 18 of the lens changer member 16, to thereby permit the member 16 to be turned with respect to a person's eyeball as required.

To turn the member 16, the control shaft has mounted on an end thereof a knurled knob 21 formed with a reduced portion 22 and a laterally spring biased ball 24 engageable with the annular surface 25 of the bore of the handle 10 when assembled.

This spring loaded ball will frictionally engage the bore surface 25 and hold the control rod set to provide proper selected positions of the lens inserter or remover portions 19 and 20 of the member 16 as desired.

Assembled FIG. 1 illustrates the respective positions of the eyeball E, the lid engaging oval ring or loop 11, lens inserter and remover member 16, and a finger activated spring filament 26 mounted in the end bore of the handle 10 for contacting with the flexible spring end 14a of the control shaft 14 when a finger button 28 carried by the spring filament 26 is pressed, to thereby impart engagement with the flexible spring 14a which carries the lens changer member 16.

Figure 3:
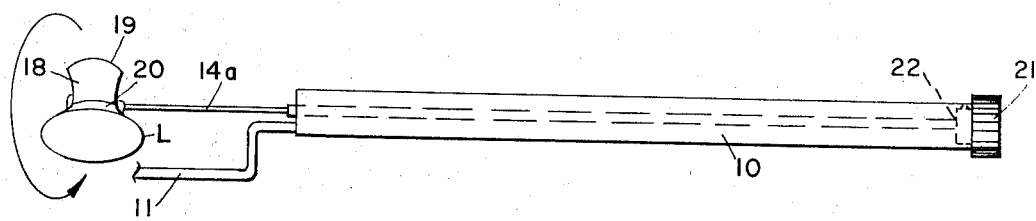
FIG. 3 is a second embodiment of the invention wherein the finger activated filament is attached to the control shaft per se.

A second embodiment is illustrated in FIG. 3, wherein the finger button activator filament spring of FIGS. 1 and 2 is eliminated. In this arrangement contact by the user's finger is made directly with the flexible spring section 14a of the control shaft 14. Otherwise operation is similar to the first embodiment and the lens inserter is flipped or turned by the turning knob 21 and the remover portion 19 of the vacuum lens holder 20 is pressed to release the lens L as desired.

The lens changer is preferably as disclosed in my above-identified prior application and comprises a soft rubber suction cup 20 manually releasable by pressure on the portion 19, as illustrated. Without further description, it is believed that the advantages over the prior art are apparent and while only two embodiments are illustrated, it is to be expressly understood that the same is not limited thereto as various changes may be made in the combination and arrangement of the parts illustrated, as will now likely occur to others skilled in the art.

I claim:

1. A device for insertion or removal of contact lens from an eyeball comprising a tubular handle with a bore, a mounting means at an end of the handle in the bore, a control shaft having a relatively rigid main portion and a flexible resilient filament formed with retainer means on its distal end extending through the handle, a contact lens holder mounted on the distal end in said retainer means of said resilient filament, and a knob on the opposite end of said control shaft for turning said shaft to impart movement to position the said lens holder and a resilient activator means mounted at an end of the handle juxtaposed with respect to said resilient filament for moving said lens holder to and from the eyeball as required for lens insertion or removal.

2. A contact lens inserter and remover comprising a handle, a lens holder mounted at an end of the handle, a shaft rotatably mounted in the handle and extending from each end of the handle, means carried by the shaft turnable to rotate the shaft, said means comprising a knob secured to the said shaft at the end opposite to said lens holder end to position the lens holder to inserting or removal positions, and a flexible spring filament connected to an end of said shaft looped around a portion of said lens holder, whereby the said filament may be finger pressed into lens insertion position with respect to an eyeball, said handle comprising a hollow tube and including a second resilient spring filament extending from an end thereof in juxtaposed spaced relation with respect to the said flexible spring filament looped around a portion of said lens holder, whereby said second spring filament may be manually pressed into engagement with said first mentioned spring filament for contact lens insertion or removal.

* * * * *